US008140228B2

(12) United States Patent
McCabe et al.

(10) Patent No.: US 8,140,228 B2
(45) Date of Patent: Mar. 20, 2012

(54) SYSTEM AND METHOD FOR DYNAMICALLY MAINTAINING THE STABILITY OF A MATERIAL HANDLING VEHICLE HAVING A VERTICAL LIFT

(75) Inventors: Paul Patrick McCabe, Binghamton, NY (US); Paul F. Finnegan, Binghamton, NY (US); Augustus Baldini, Binghamton, NY (US); Shane Storman, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 477 days.

(21) Appl. No.: 12/413,131

(22) Filed: Mar. 27, 2009

(65) Prior Publication Data

US 2010/0250073 A1 Sep. 30, 2010

(51) Int. Cl.
*G06F 7/70* (2006.01)
*B60G 17/005* (2006.01)

(52) U.S. Cl. .......................................... 701/50; 414/636

(58) Field of Classification Search .................... 701/50, 701/29, 124, 36; 73/65.01, 65.09; 414/630, 414/631, 635, 636, 639, 640; 280/5.507, 280/5.5, 5.515, 5.519, 6.15, 6.159, 6.157, 280/755; 180/282
See application file for complete search history.

(56) References Cited

U.S. PATENT DOCUMENTS

| | | | | |
|---|---|---|---|---|
| 4,511,974 | A | 4/1985 | Nakane et al. | |
| 4,942,529 | A | 7/1990 | Avitan et al. | |
| 5,189,920 | A | 3/1993 | Martinez | |
| 5,778,327 | A | 7/1998 | Simmons et al. | |
| 5,879,061 | A | 3/1999 | Koibuchi | |
| 5,947,516 | A | 9/1999 | Ishikawa | |
| 5,995,001 | A | 11/1999 | Wellman et al. | |
| 6,050,770 | A | 4/2000 | Avitan | |
| 6,056,501 | A * | 5/2000 | Ishikawa et al. | 414/636 |
| 6,122,568 | A | 9/2000 | Madau et al. | |
| 6,170,341 | B1 | 1/2001 | Avitan | |
| 6,385,518 | B1 | 5/2002 | Rickers et al. | |
| 6,425,728 | B1 | 7/2002 | Goto | |
| 6,477,455 | B2 | 11/2002 | Panizzolo | |
| 6,611,746 | B1 * | 8/2003 | Nagai | 701/50 |
| 6,785,597 | B1 | 8/2004 | Farber et al. | |
| 6,829,524 | B2 | 12/2004 | Chee | |
| 6,853,902 | B2 | 2/2005 | Miller et al. | |
| 7,063,334 | B2 | 6/2006 | Lim | |
| 7,108,096 | B1 | 9/2006 | Oxley et al. | |
| 7,165,643 | B2 | 1/2007 | Bozem et al. | |

(Continued)

FOREIGN PATENT DOCUMENTS

EP 0873893 A2 10/1998

(Continued)

OTHER PUBLICATIONS

Extended European Search Report, Application No. 10157424.2-1256, Jul. 9, 2010.

*Primary Examiner* — Robert Pezzuto
(74) *Attorney, Agent, or Firm* — Quarles & Brady LLP

(57) ABSTRACT

A system and method that maintains the dynamic stability of a material handling vehicle having a vertical lift. The method allows static vehicle properties, such as vehicle weight, wheelbase length, and wheel configuration, and dynamic operating parameters, such as vehicle velocity, floor grade, lift position, and load weight, to be accounted for when maintaining the dynamic stability of a moving material handling vehicle. The method may include calculating and predicting center-of-gravity parameters, wheel loads, and projected force vectors multiple times a second and adjusting vehicle operating parameters in response thereto to maintain vehicle stability.

16 Claims, 5 Drawing Sheets

U.S. PATENT DOCUMENTS

| | | | |
|---|---|---|---|
| 7,216,024 B1 | 5/2007 | Abels et al. | |
| 7,706,947 B2 | 4/2010 | Bozem et al. | |
| 7,896,358 B2 * | 3/2011 | Hoff | 280/5.5 |
| 2010/0204891 A1 | 8/2010 | Biggerstaff | |

FOREIGN PATENT DOCUMENTS

| | | |
|---|---|---|
| EP | 1 019 315 B1 | 8/2002 |
| EP | 1813569 A1 | 8/2007 |
| GB | 2 045 969 A | 11/1980 |
| JP | 09315797 | 12/1997 |
| JP | 10175800 | 6/1998 |
| JP | 2001199698 | 7/2001 |
| JP | 2001226096 | 8/2001 |
| JP | 2003081597 | 3/2003 |
| JP | 2005096894 | 4/2005 |
| JP | 2005280992 | 10/2005 |

* cited by examiner

SYSTEM AND METHOD FOR DYNAMICALLY MAINTAINING THE STABILITY OF A MATERIAL HANDLING VEHICLE HAVING A VERTICAL LIFT

CROSS-REFERENCE TO RELATED APPLICATIONS

N/A

BACKGROUND OF THE INVENTION

The present invention relates to the field of industrial trucks and, in particular, to a dynamic stability control system for a material handling vehicle having a lifting fork.

One method for improving material handling vehicle stability includes performing a static center-of-gravity (CG) analysis while the vehicle is at rest and limiting vehicle operating parameters (for example, maximum speed and steering angle) accordingly. However, this static calibration does not dynamically account for vehicle motion, changing lift heights, or environmental factors such as the grade of a driving surface.

Other methods for improving vehicle stability common in consumer automobiles include calculating vehicle CG during vehicle movement and employing an anti-lock braking system (ABS) to modify the cornering ability of the vehicle. These prior art methods only consider two-dimensional vehicle movement (forward-reverse and turning) and do not, for example, account for three-dimensional CG changes due to load weights being lifted and lowered while a vehicle is in motion.

It would therefore be desirable to have a method for dynamically maintaining the stability of a material handling vehicle that accounts for vehicle motion and complex CG changes imposed by a load weight.

SUMMARY OF THE INVENTION

The present invention overcomes the drawbacks of previous methods by providing a system and method for improving the dynamic stability of a material handling vehicle that is able to dynamically assess vehicle stability and adjust vehicle operation in response. The method includes analyzing dynamic vehicle properties such as velocity, travel direction, acceleration, floor grade, load weight, lift position and predicting wheel loads and three-dimensional center-of-gravity positions.

The present invention provides a method of maintaining the dynamic stability of a material handling vehicle having a vertical lift. The method includes continuously calculating dynamic center-of-gravity parameters for the vehicle over a time interval during which the vehicle is moving, wherein a vertical position of the dynamic center-of-gravity is strongly dependent on a position of the vertical lift. The method further includes continuously calculating wheel loads based on the calculated dynamic center-of-gravity parameters and adjusting vehicle operating parameters based on calculated and predicted wheel loads and center-of-gravity parameters to maintain vehicle dynamic stability.

The present invention also provides a material handling vehicle including a motorized vertical lift, traction motor, steerable wheel, steering control mechanism, and brake. The material handling vehicle further includes a stability control system having a plurality of sensors configured to measure dynamic vehicle properties, a sensor input processing circuit, a vehicle memory configured to store static vehicle properties. The control system further includes a stability computer, vehicle control computer, and a plurality of vehicle function controllers configured to maintain vehicle dynamic stability in accordance with the above-mentioned method.

Various other features of the present invention will be made apparent from the following detailed description and the drawings.

DETAILED DESCRIPTION OF THE INVENTION

The present invention provides a system and method for maintaining the dynamic stability of a material handling vehicle having a vertical lift. Generally, the vehicle's wheel loads and dynamic CG parameters are calculated over a time period during which the vehicle is moving and the vehicles operating parameters are adjusted based on the calculated wheel loads and CG parameters, as well as predicted wheel load and CG parameters.

Figure 1:
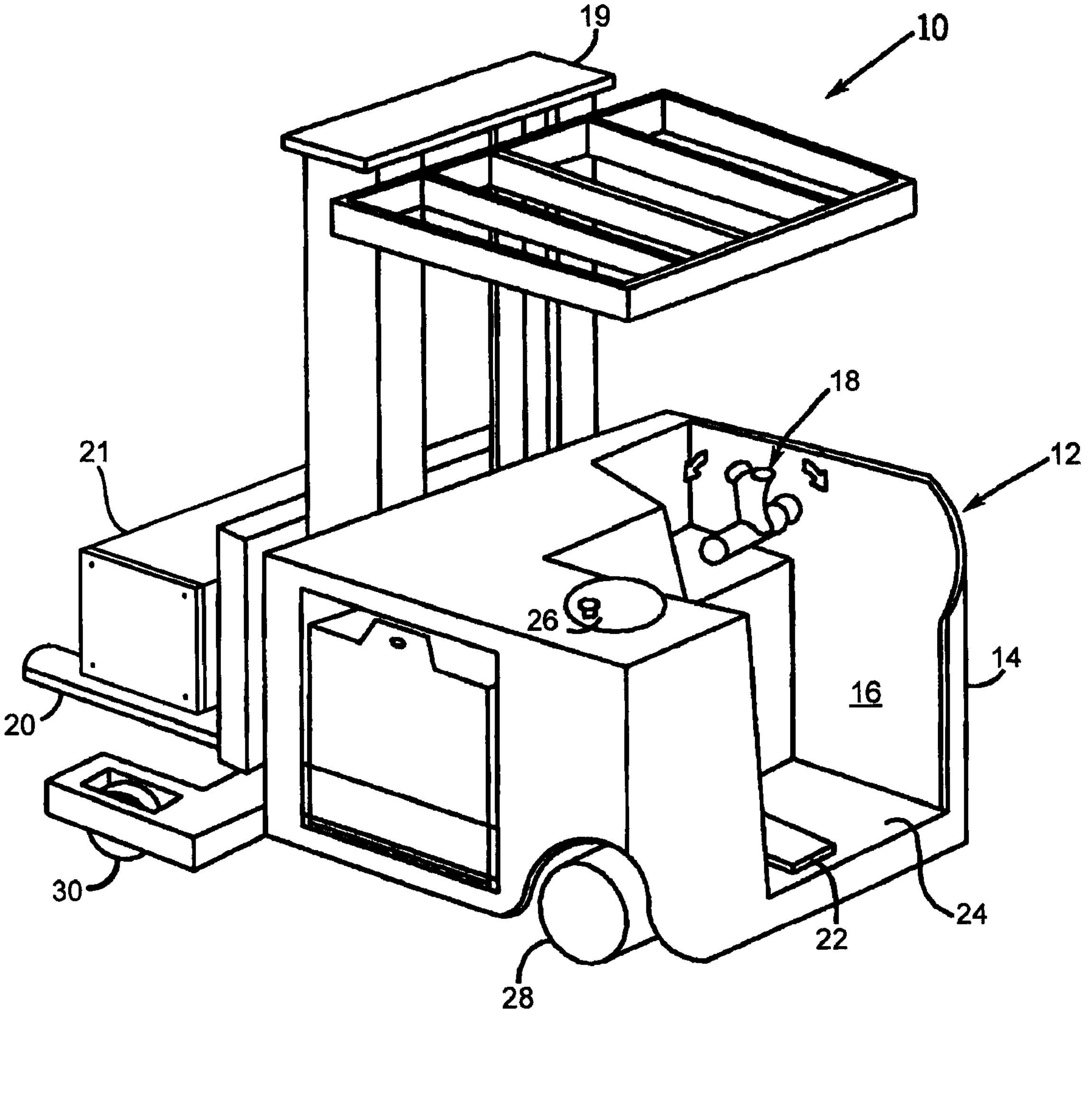
FIG. 1 is a perspective view of a lift truck employing a stability control system in accordance with the present invention.

Referring now to the Figures, and more particularly to FIG. 1, one embodiment of a material handling vehicle or lift truck 10 which incorporates the present invention is shown. The material handling vehicle 10 includes an operator compartment 12 comprising a body 14 with an opening 16 for entry and exit of the operator. The compartment 12 includes a control handle 18 mounted to the body 14 at the front of the operator compartment 12 proximate the vertical lift 19 and forks 20 carrying a load 21. The lift truck 10 further includes a floor switch 22 positioned on the floor 24 of the compartment 12. A steering wheel 26 is also provided in the compartment 12 disposed above the turning wheel 28 it controls. The lift truck 10 includes two load wheels 30 proximate to the fork 20 and vertical lift 21. Although the material handling vehicle 10 as shown by way of example as a standing, fore-aft stance operator configuration lift truck, it will be apparent to those of skill in the art that the present invention is not limited to vehicles of this type, and can also be provided in various other types of material handling and lift vehicle configurations. For brevity and simplicity, material handling vehicles are hereinafter referred to simply as "vehicles" and "loaded vehicles" when carrying a load weight.

Figure 2:
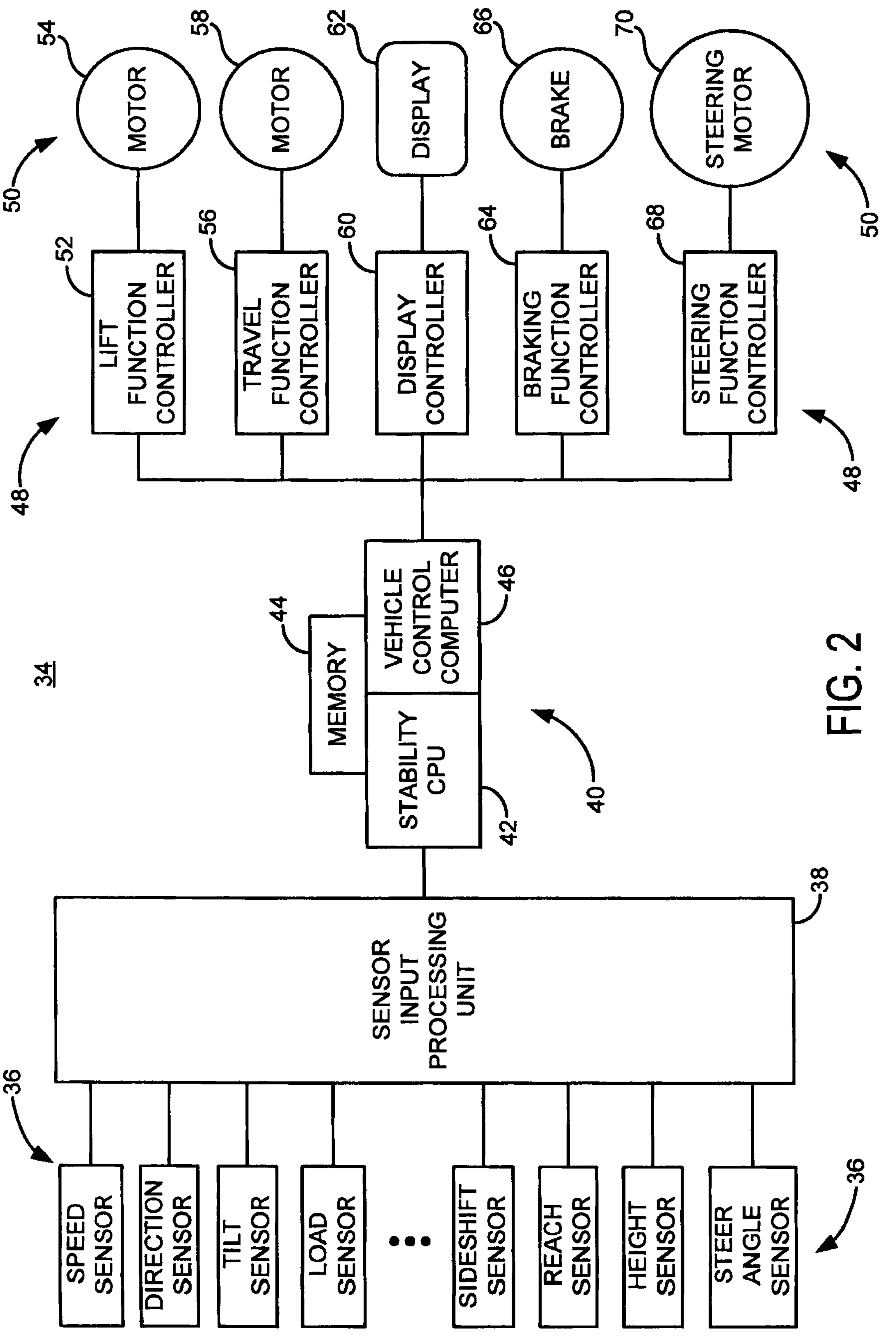
FIG. 2 is a schematic view of a control system for maintaining the dynamic stability of a material handling vehicle in accordance with the present invention.

Referring now to FIG. 2, one embodiment of a control system 34 configured to maintain vehicle dynamic stability in accordance with the present invention is shown. The control system 34 includes an array of sensors 36 linked to a sensor input processing circuit 38, which are together configured to acquire and process signals describing dynamic vehicle properties such as speed, direction, steering angle, floor grade, tilt, load weight, lift position, and sideshift. For example, the sensor array 36 may employ a motor controller, tachometer, or encoder to measure vehicle speed; a potentiometer or feedback from a steering control circuit to measure steering angle; a load cell, hydraulic pressure transducer, or strain gauge to measure load weight; an encoder to measure lift height; or three-axis accelerometers to measure tilt, sideshift, reach, and floor grade. The sensor input processing circuit 38 is linked to a vehicle computer system 40 that includes a stability CPU 42, vehicle memory 44, and vehicle control computer 46, which together analyze static vehicle properties and dynamic vehicle properties to assess vehicle stability. Changes to vehicle operating parameters based on the assessed vehicle stability are communicated from the vehicle control computer 46 to function controllers 48, which adjust the operation of vehicle actuators, motors, and display systems 50 to maintain vehicle stability. For example, adjusted vehicle operating parameters may be received by a lift function controller 52 that activates a motor 54 to change lift position; a travel function controller 56 to relay maximum speed limitations to a vehicle motor 58; a display controller 60 and display 62 to communicate present or pending changes in vehicle operating parameters to a driver; and a steering function controller 68 that directs a steering motor 70 to limit steering angle. The vehicle control computer may also include a braking function controller 64 and brake 66 to adjust vehicle speed.

Figure 3:
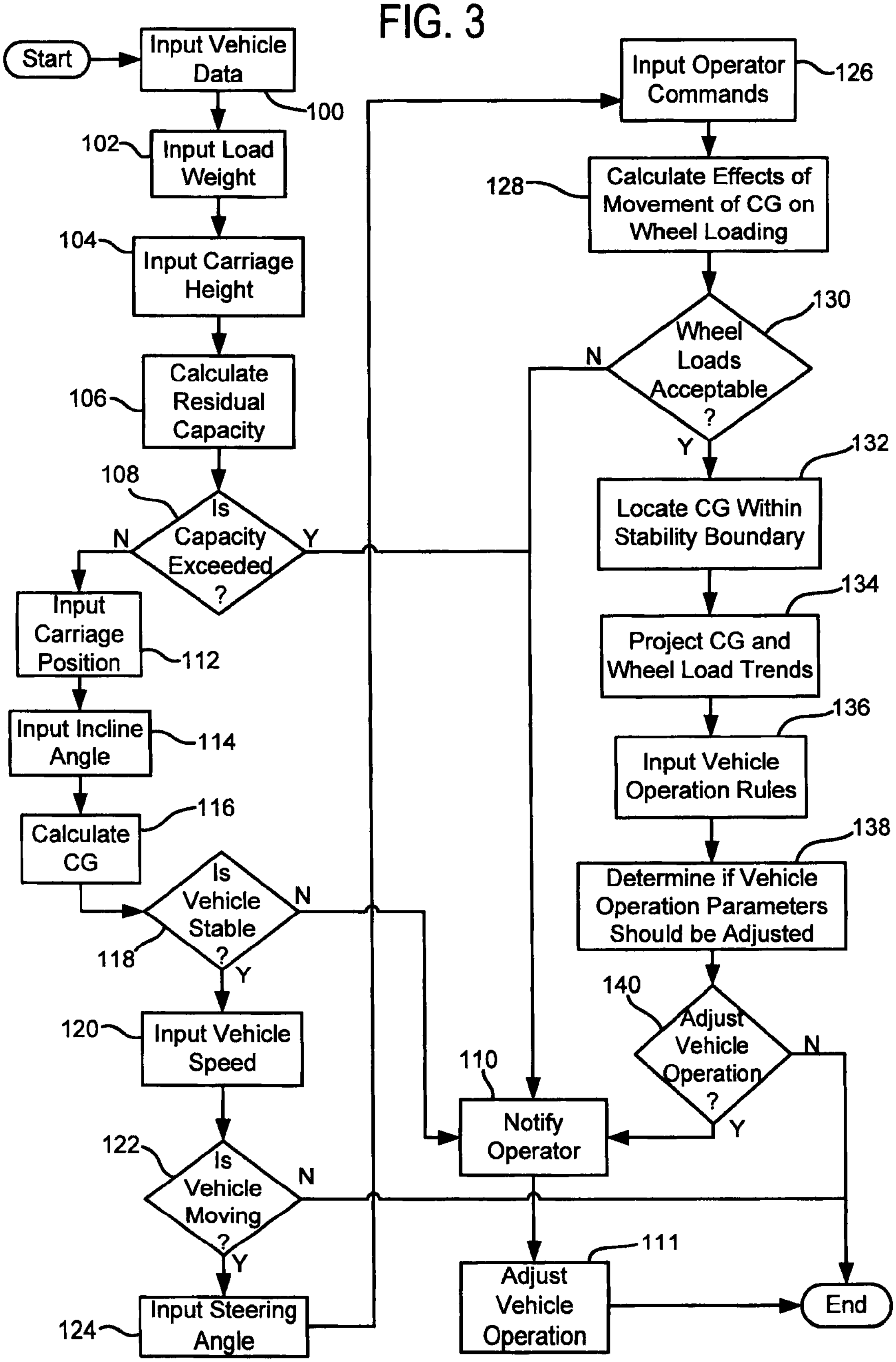
FIG. 3 is a flowchart setting forth the steps for assessing and maintaining the dynamic stability of a material handling vehicle in accordance with the present invention.

Referring to FIG. 3, the above lift truck 10 and control system 34 may be employed to maintain vehicle dynamic stability. A method for maintaining dynamic vehicle stability starts at process block 100 with the input of vehicle data to the vehicle computer system 40. Vehicle data, which is retrieved from the vehicle memory 44, may include static vehicle properties such as unloaded vehicle weight and CG, wheelbase length, and wheel width and configuration. At process blocks 102 and 104 respectively load weight and carriage height are input from the sensor array 36 and sensor input processing circuit 38 to the computer system 40. A residual capacity is then calculated at process block 106 to determine if vehicle capacity, for example, vehicle position and load weight, is within acceptable bounds. If, at decision block 108, it is decided that vehicle capacity is exceeded, then the driver is notified at process block 110 and vehicle operation may be limited at process block 111. If vehicle capacity is within the acceptable bounds, then carriage position and vehicle incline angle are input at process blocks 112 and 114 respectively.

Figure 4A:
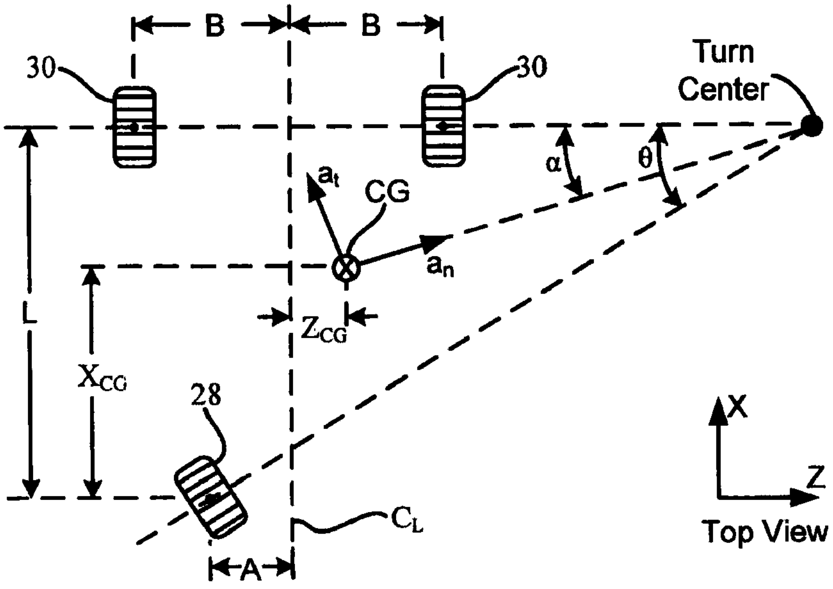
FIGS. 4A-4C are alternate views of a free-body diagram for a three-wheeled material handling vehicle that may be employed to calculate vehicle center-of-gravity and wheel loads in accordance with the present invention.
Figure 4B:
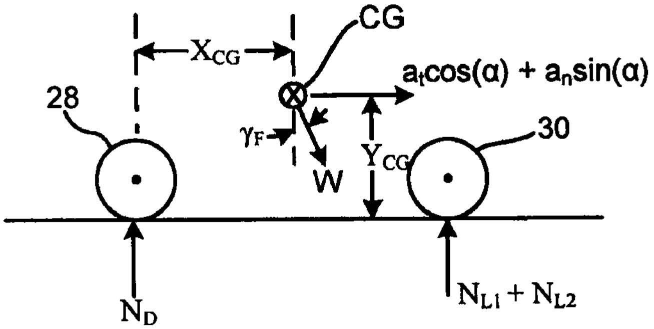
Figure 4C:
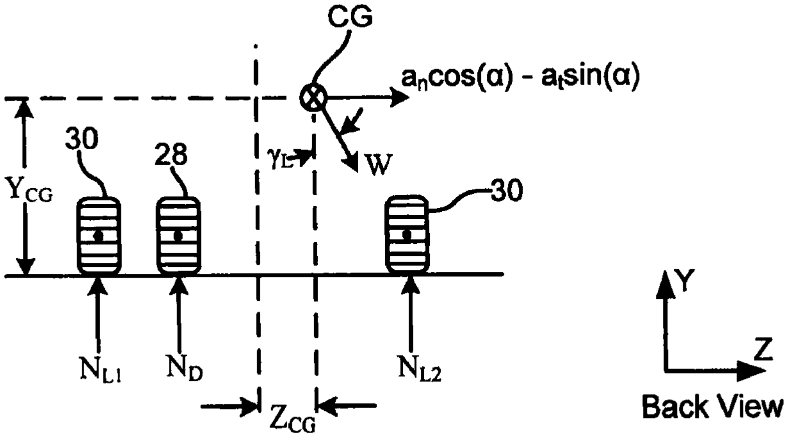

Referring now to FIGS. 3 and 4, loaded vehicle CG is calculated at process block 116 by the stability CPU 42 based on static vehicle properties input at process block 100 and the dynamic vehicle properties such as those input at process blocks 102, 104, 112, and 114. For example, the free-body diagram (FBD) shown in FIG. 4 shows the position of the CG, indicated by $X_{CG}$, $Y_{CG}$, and $Z_{CG}$, in relation to the turning wheel and load wheels of a three-wheel material handling vehicle and the loaded weight W at the CG. It should be noted that $Y_{CG}$ is strongly dependent on load weight and lift position and that heavy load weights at increasing lift heights elevate the CG and reduce vehicle stability. If, at decision block 118, the vehicle is deemed stable, then vehicle speed is input at process block 120 and vehicle movement is assessed at decision block 122. If the vehicle is moving, then the steering angle is input at process block 124 and operator commands are input at process block 126.

At process block 128, the effects of vehicle movement on wheel loading are calculated. For example, wheel loads for a three-wheeled vehicle can be calculated by again considering the FBD of FIG. 4, which describes the distance A from the vehicle centerline $C_L$ to the turning wheel 28, the distance B from the $C_L$ to the load wheels 30, and the distance L between the turning wheel 28 and the axis-of-rotation of the load wheels 30. From these distances and the steering angle θ input at process block 124, a heading angle α and turning radius r are calculated using the following equations:

$$\alpha = A\tan\left(\frac{L - X_{CG}}{\frac{L}{\tan\theta} - B + A}\right); \qquad \text{Eqn. 1}$$

and $$r = \frac{L - X_{CG}}{\sin\alpha}. \qquad \text{Eqn. 2}$$

Normal and tangential accelerations, $a_t$ and $a_n$ respectively, are then calculated using the following equations:

$$a_i = \frac{v - v_o}{t}; \qquad \text{Eqn. 3}$$

and $$a_n = \frac{v^2}{r}; \qquad \text{Eqn. 4}$$

where v is current vehicle velocity, $v_o$ is the last measured vehicle velocity, t is the time between velocity measurements. It is then possible, using these values and by analyzing the FBD of FIG. 3, to produce the following equations describing wheel load:

$$N_D = \frac{W(L - X_{CG})\cos(\gamma_F) - WY_{CG}\sin(\gamma_F) + \frac{WY_{CG}}{386.4}(a_t\cos(\alpha) - a_n\sin(\alpha))}{L}; \qquad \text{Eqn. 5}$$

$$N_{L1} = \frac{W(B - Z_{CG})\cos(\gamma_L) - WY_{CG}\sin(\gamma_L) + \frac{WY_{CG}}{386.4}(a_n\cos(\alpha) - a_t\sin(\alpha))}{2B}; \qquad \text{Eqn. 6}$$

and $$N_{L2} = W\cos(\alpha_L)\cos(\alpha_F) - N_D - N_{L1}; \qquad \text{Eqn. 7}$$

where $\gamma_L$ is the lateral ground angle and $\gamma_F$ is the fore/aft ground angle as determined at process block 114. In this case, $N_D$ is the load at the turning wheel, $N_{L1}$ is the load at the left load wheel, and $N_{L2}$ is the load at the right load wheel.

Referring to FIG. 3, at decision block 130 it is decided if the wheel loads are acceptable. If unacceptable, for example, a wheel load approaching zero or another predetermined threshold, then the system notifies the operator at process block 110 and adjusts vehicle operation at process block 111 to maintain vehicle stability. For example, the computer system 40 may adjust vehicle operation by limiting or reducing the vehicle speed and communicate these changes to the operator via the display controller 60 and display 62. Advantageously, the present invention further improves vehicle dynamic stability by allowing future CG parameters and wheel loads to be predicted based on trends in the measured dynamic vehicle properties and for vehicle operating parameters to be adjusted accordingly.

Figure 5:
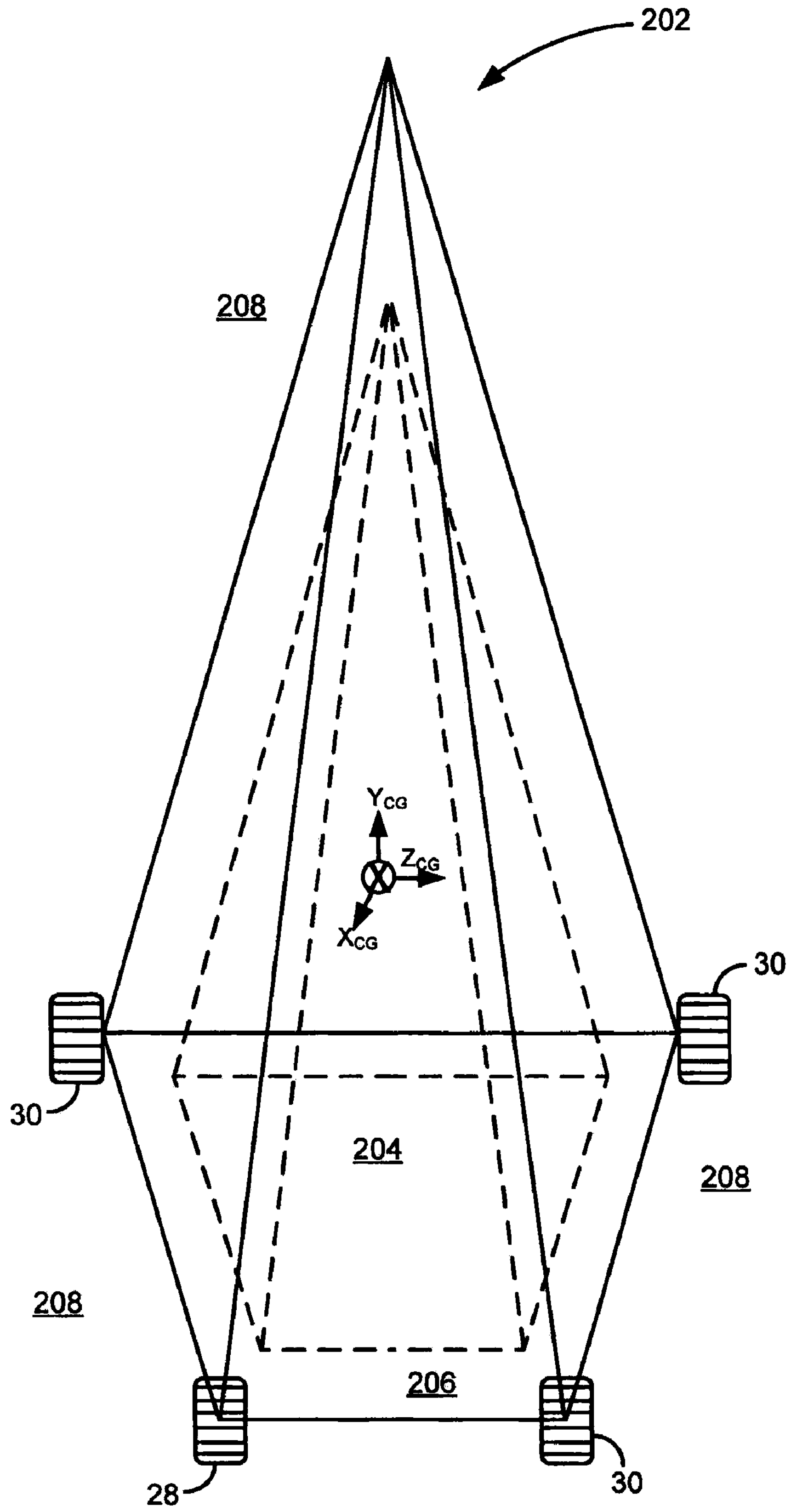
FIG. 5 is a schematic showing vehicle stability in relation to center-of-gravity position in accordance with the present invention.

Referring to FIGS. 3 and 5, at process block 102 the CG position determined at process block 84 is compared to a range of stable CG positions. It is contemplated that this may be performed by locating the CG position 200 within a stability map 202 relating a range of potential CG positions to vehicle stability. It should be noted that the stability map 202 is for a four-wheeled material handling vehicles having two turning wheels 28 and two load wheels 30. The stability map 202 may include a preferred region 204, limited region 206, and undesirable region 208 whose sizes are dependent on system operating parameters. For example, applications requiring a high top speed may employ more stringent vehicle stability requirements and thus reduce the size of the preferred region 204. At process block 134, trends in measured dynamic vehicle properties, CG parameters, and wheel loads are analyzed to predict future vehicle stability. This may be achieved, for example, by analyzing trends in CG position 200 to determine its likelihood of entering the limited region 206 or by analyzing wheel loading trends to ensure that they remain within stable bounds. To adequately model future vehicle stability it is contemplated that the CG parameters and wheel loads are calculated approximately ten times per second.

At process block 136, vehicle operation rules are input to the computer system and, at process block 138, parameters relating to future vehicle stability, for example, predicted wheel loads or CG position, are compared to the vehicle operation rules to determine if vehicle operating parameters should be adjusted in response. If, at decision block 140, it is decided that vehicle operating parameters should be adjusted, then the driver is notified at process block 110 and the control system specifies an appropriate change in vehicle operating parameters to maintain vehicle stability at process block 111. For example, if a wheel load falls below a minimum threshold specified by the vehicle operation rules, then vehicle speed may be limited to prevent further reduction in wheel load and the accompanying reduction in vehicle stability. It is contemplated that vehicle dynamic stability may also be improved in such an event by limiting steering angle, lift height, or vehicle speed.

In addition to the calculated CG parameters and wheel loads, potential force vectors projected by the vehicle may also be analyzed to maintain vehicle dynamic stability. An accelerating vehicle projects a force approximately equaling the mass of the vehicle (including a load) times vehicle acceleration. This force vector, which is centered at the CG and projected in the direction of travel, is typically counteracted by the weight of the vehicle. However, if the projected force vector exceeds the vehicle weight, then the vehicle parameters may require modification. Therefore, the present invention may analyze trends in the projected force vector and adjust vehicle operation if the force vector exceeds a threshold specified by the vehicle operation rules.

The present invention provides another method for maintaining vehicle dynamic stability. Possible low-stability scenarios such as a sudden change in vehicle speed or direction can be modeled and vehicle CG, wheel loads, and force vectors can be predicted in the event of such a scenario. If the modeled CG parameters, wheel loads, and force vectors fall outside a preferred range, then vehicle operation parameters may be adjusted to improve vehicle stability during the potential low-stability scenario.

The present invention has been described in accordance with the embodiments shown, and one of ordinary skill in the art will readily recognize that there could be variations to the embodiments, and any variations would be within the spirit and scope of the present invention. It is contemplated that addition sensors and vehicle properties could be employed to further improve vehicle stability. Conversely, vehicle properties and the associate hardware used to measure and process them may be excluded from the present invention to reduce system costs and complexity. Accordingly, many modifications may be made by one of ordinary skill in the art without departing from the spirit and scope of the appended claims.

We claim:

1. A method of maintaining a dynamic stability of a material handling vehicle having a vertical lift, the method comprising:

a) continuously calculating dynamic center-of-gravity parameters for the vehicle over a time interval during which the vehicle is moving, wherein a vertical position of the dynamic center-of-gravity is dependent on a position of the vertical lift;

b) continuously calculating wheel loads based on the calculated dynamic center-of-gravity parameters; and c) adjusting vehicle operating parameters based on the calculated wheel loads and center-of-gravity parameters to maintain vehicle dynamic stability.

2. The method as recited in claim 1 further including predicting center-of-gravity parameters and wheel loads and adjusting vehicle operating parameters based on the predicted center-of-gravity parameters and wheel loads to maintain vehicle stability.

3. The method as recited in claim 2 further including adjusting vehicle operating parameters to maintain stability in the event of potential sudden changes in vehicle speed or vehicle travel direction.

4. The method as recited in claim 3 wherein step b) further includes calculating a force vector projected by the vehicle based on the potential sudden changes in vehicle velocity and travel direction and step c) further includes continuously determining the stability of the vehicle based on the calculated potential force projected by the vehicle.

5. The method as recited in claim 1 wherein the dynamic center-of-gravity parameters and wheel loads are calculated multiple times per second over the time interval during which the vehicle is moving.

6. The method as recited in claim 2 wherein the calculated center-of-gravity parameters include at least one of center-of-gravity position, heading angle at the center-of-gravity, and turning radius at the center-of-gravity.

7. The method as recited in claim 6 further including:

c) i) generating a range of preferred center-of-gravity positions;

c) ii) comparing the determined dynamic center-of-gravity positions to the range of preferred center-of-gravity positions; and c) iii) adjusting vehicle operating parameters to prevent future dynamic center-of-gravity positions from leaving the range of preferred center-of-gravity positions.

8. The method as recited in claim 7 further including:

c) iv) generating a range of stable wheel loads;

c) v) mapping the determined wheel loads to the range of preferred wheel loads; and c) vi) adjusting vehicle operating parameters to prevent future wheel loads from leaving the range of preferred wheel loads.

9. The method as recited in claim 1 wherein the vehicle is one of a fork lift, reach lift, or order picker.

10. The method as recited in claim 1 wherein the calculated center-of-gravity positions and wheel loads are based on static vehicle properties and dynamic vehicle properties.

11. The method as recited in claim 10 wherein the static vehicle properties include at least one of unloaded weight, wheelbase length, wheel width and configuration, and unloaded center-of-gravity.

12. The method as recited in claim 10 wherein the dynamic vehicle properties include at least one of travel velocity, acceleration, load weight, fork tilt, mast tilt, carriage sideshift position, reach position, pantograph scissors position, steering angle, floor grade, and ramp grade.

13. A material handling vehicle including a motorized vertical lift, traction motor, steerable wheel, steering control mechanism, and an improved stability control system comprising:

a plurality of sensors sensing dynamic vehicle properties, each of said sensors providing a signal corresponding to a sensed vehicle property;

a sensor input processing circuit for receiving at least one of said signals;

a vehicle memory configured to store static vehicle properties;

a CPU processing said signals in accordance with the steps of claim 1; and a plurality of vehicle operation controllers controlled by said CPU and controlling vehicle operating parameters.

14. The material handling vehicle of claim 13 wherein the plurality of sensors are configured to measure dynamic vehicle properties multiple times per second while the vehicle is moving.

15. The stability control system of claim 14 wherein the plurality of sensors includes at least one of a speed sensor, direction sensor, load sensor, tilt sensor, sideshift sensor, reach sensor, lift position sensor, and steer angle sensor.

16. The stability control system of claim 13 wherein the plurality of vehicle operation controllers include at least one of a lift function controller configured to control the position of the vertical lift, a travel function controller configured to control the travel speed of the vehicle, a display controller configured to control a display showing vehicle operation information, and a steering function controller configured to limit steering.

* * * * *

UNITED STATES PATENT AND TRADEMARK OFFICE
CERTIFICATE OF CORRECTION

PATENT NO. : 8,140,228 B2
APPLICATION NO. : 12/413131
DATED : March 20, 2012
INVENTOR(S) : Paul P. McCabe et al.

It is certified that error appears in the above-identified patent and that said Letters Patent is hereby corrected as shown below:

Column 4, line 20, "$a_i$" should be -- $a_t$ --

Signed and Sealed this
Eighth Day of May, 2012

David J. Kappos
*Director of the United States Patent and Trademark Office*